(12) United States Patent
Fujinawa et al.

(10) Patent No.: US 7,337,312 B2
(45) Date of Patent: Feb. 26, 2008

(54) PROCESSOR AND FIRMWARE DOWNLOAD METHOD FOR SAME

(75) Inventors: Osamu Fujinawa, Niigata (JP); Naoki Shigeno, Niigata (JP)

(73) Assignee: Fuji Xerox Co., Ltd., Tokyo (JP)

( * ) Notice: Subject to any disclaimer, the term of this patent is extended or adjusted under 35 U.S.C. 154(b) by 405 days.

(21) Appl. No.: 11/181,944

(22) Filed: Jul. 15, 2005

(65) Prior Publication Data

US 2006/0168441 A1    Jul. 27, 2006

(30) Foreign Application Priority Data

Jan. 21, 2005   (JP)   ............................. 2005-014262

(51) Int. Cl.
  *G06F 9/00*   (2006.01)
  *G06F 9/24*   (2006.01)
(52) U.S. Cl. .............................................. 713/2; 713/1
(58) Field of Classification Search ..................... 713/2
  See application file for complete search history.

(56) References Cited

U.S. PATENT DOCUMENTS 6,078,967 A * 6/2000 Fulghum ..................... 710/2
2005/0138645 A1* 6/2005 Lu ............................ 719/321

FOREIGN PATENT DOCUMENTS

JP   A 2001-147787   5/2001

* cited by examiner

*Primary Examiner*—Rehana Perveen
*Assistant Examiner*—Stefan Stoynov
(74) *Attorney, Agent, or Firm*—Oliff & Berridge, PLC

(57) ABSTRACT

A processor comprises a central processing unit that downloads firmware from outside after starting a second program that depends on a device, stores the downloaded firmware in a volatile memory, and executes predetermined processing based on the firmware stored in the volatile memory; and a non-volatile memory that stores a device-independent first program for downloading the second program in a first program storage area thereof, wherein the central processing unit starts the first program stored in the first program storage area of the non-volatile memory to download the second program from the outside, writes the downloaded second program in a second program storage area of the non-volatile memory, and starts the second program written in the second program storage area to download the firmware from the outside.

5 Claims, 8 Drawing Sheets

PROCESSOR AND FIRMWARE DOWNLOAD METHOD FOR SAME

BACKGROUND OF THE INVENTION

1. Field of the Invention

The present invention relates to a processor having a central processing unit for storing firmware in a volatile memory and performing predetermined processing based on the firmware stored in the volatile memory, and also relates to a method of downloading the firmware. More particularly, the present invention relates to a processor capable of downloading firmware independent of a specific apparatus, and to a method of downloading the firmware.

2. Description of the Related Art

An image forming device such as a printer, a copy machine, or a multiple function printer typically has a group of control programs incorporated therein for controlling operation thereof, and these control programs are called firmware. When such image forming device is used to perform image forming operation, for example, operation of the components of the apparatus is controlled by the firmware to form images on paper or the like.

The firmware is generally stored in a non-volatile memory arranged on a printed control board (processor) within the image forming device. However, a technology is also known, as described in Japanese Patent application publication No. 2001-147787, which downloads firmware from an external computer into a volatile memory within the image forming device.

In recent years' circumstance, a number of types of products has been increasing to meet customers' demand for a greater variety of products. Since this circumstance can mostly be coped with by altering firmware, components forming the image forming device, such as a printed control board, can be used in common among several types of products.

In actual situation, however, a non-volatile memory having device-specific information is arranged on such printed control board, which induces a problem that a different board must be prepared for each model of products.

Further, as disclosed in Japanese Patent application publication No. 2001-147787, there is a type in which the firmware is stored in a volatile memory instead of in a non-volatile memory. According to the technology of Japanese Patent application publication No. 2001-147787, device-specific information such as a model name is pre-stored in the non-volatile memory for determining which firmware is compatible with the device before downloading the firmware. Therefore, as similar to the above, the printed control board provided within the image forming device has no versatility and is operable only in specific devices.

SUMMARY OF THE INVENTION

The present invention has been made in view of the above circumstances and provides a processor having high versatility independent of a specific device, and a method of downloading firmware for such a processor.

According to an aspect of the invention, a processor comprises a central processing unit that downloads firmware from outside after starting a second program that depends on a device, stores the downloaded firmware in a volatile memory, and executes predetermined processing based on the firmware stored in the volatile memory; and a non-volatile memory that stores a device-independent first program for downloading the second program in a first program storage area thereof, wherein the central processing unit starts the first program stored in the first program storage area of the non-volatile memory to download the second program from the outside, writes the downloaded second program in a second program storage area of the non-volatile memory, and starts the second program written in the second program storage area to download the firmware from the outside.

According to another aspect of the invention, a firmware download method for a processor comprises a central processing unit that downloads firmware from the outside after starting a device-dependent second program, stores the downloaded firmware in a volatile memory and executes predetermined processing based on the firmware stored in the volatile memory, wherein a device-independent first program for downloading the second program is stored in a first program storage area of a non-volatile memory; and the central processing unit starts the first program stored in the first program storage area of the non-volatile memory to download the second program from the outside and write the same in a second program storage area of the non-volatile memory, and starts the second program written in the second program storage area to download the firmware from the outside.

With the above configurations a first program (not dependent on specific devices) stored in a non-volatile memory of the processor is started to download a second program (dependent on a specific product) from outside of the processor and write the same in a non-volatile memory, and the second program thus written is started to download firmware from outside of the processor. Therefore, a processor which is not dependent on specific devices and has high versatility can be provided. Thus, the application of the processor of the present invention is not limited to specific devices and is effective in high-mix low-volume production. Further, the production cost can be reduced.

Since the firmware is stored in the volatile memory, the firmware can be rewritten easily and thus problems due to the firmware can be eliminated easily.

When the first program has a diagnosis function, the first program is capable of checking whether the processor operates normally Therefore, the operation of the processor can be checked easily, particularly when the processor is to be reused. Such high versatility and easy reuse make it possible to use resources more effectively, and thus are effective in reducing the production cost.

BRIEF DESCRIPTION OF THE DRAWINGS

Embodiments of the present invention will be described in detail based on the following figures, wherein.

DETAILED DESCRIPTION OF THE EMBODIMENTS

Description will now be made of embodiments of a processor and a method of downloading firmware for the processor according to the present invention with reference to attached drawings.

Figure 1:
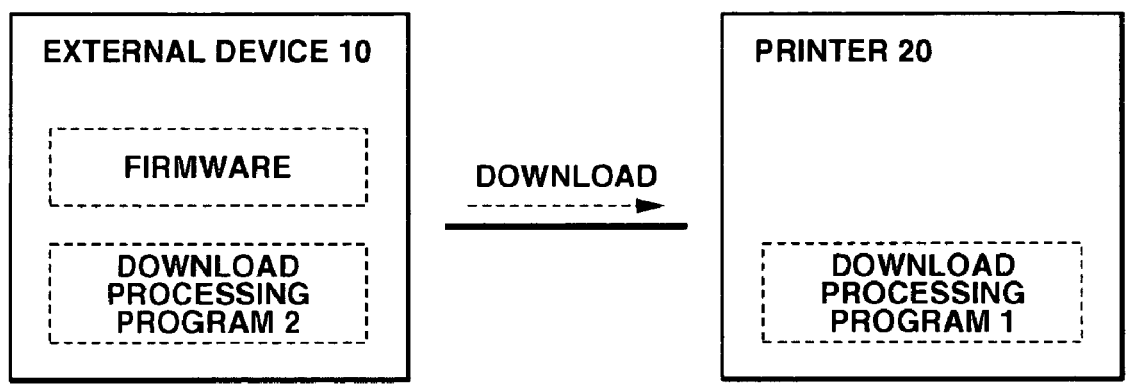
FIG. 1 shows an example of an overall configuration of an image forming system according to an embodiment of the present invention.

FIG. 1 illustrates an example of an overall configuration of an image forming system according to the present invention. In this embodiment, a processor according to the present invention is applied to a printer 20 in the form of a printed control board (printer engine controller 40).

The image forming system is composed of an external device 10 and a printer 20. This embodiment will be described in terms of a case in which the external device 10 and the printer 20 are directly connected to each other. However, as long as the functions of the present invention are implemented, the connection mode thereof is not limited particularly, and the external device 10 and the printer 20 may be connected via a network such as LAN (Local Area Network), WAN (Wide Area Network) or the like.

The external device 10 may be a personal computer or the like having a storage device (storage 15 to e described later). The external device 10 holds data including firmware (printer control programs) for controlling the printer 20 and a download processing program 2 for performing download processing of these programs. These programs are transferred to the printer 20 to operate on the printer 20.

The download processing program 2 is a program which holds device-specific information such as a model name and identification information indicating a specific device group. This program does not operate on all the printers, and is compatible with and operable only on specific printers. In conventional printers, a program corresponding to this download processing program 2 is prestored in a printed control board (printer engine controller 40), and therefore the printed control board is not versatile, being for exclusive use of specific printers.

The printer 20 holds data including a download processing program 1 for performing download processing of the download processing program 2. While details will be described later, upon the printer 20 being powered on, the download processing program 1 is started to download the download processing program 2 from the external device 10. The download processing program 2 is stored in a non-volatile memory.

After restarting, the download processing program 2 is started to download the firmware from the external device 10. This firmware controls the operation of the printer 20. The firmware, which is stored in a volatile memory, is erased when power is turned off. When the printer 20 is powered on again, the download processing of the firmware is started anew.

Figure 2:
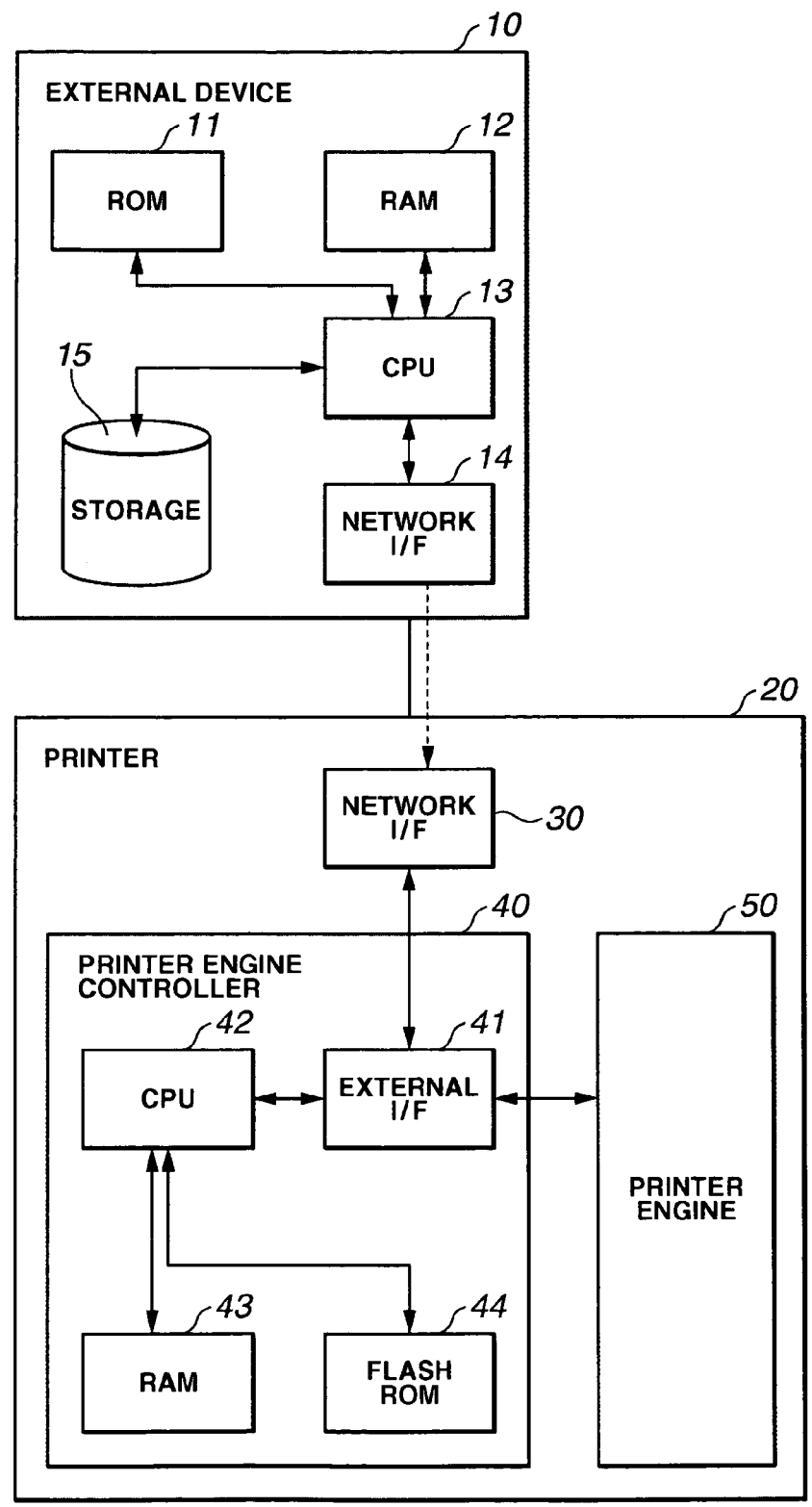
FIG. 2 illustrates a system configuration of an external device 10 and a printer 20.

FIG. 2 illustrates a system configuration of the external device 10 and printer 20 described above. The following description will be made only of constituent elements related to the present invention.

The external device 10 includes an ROM (Read Only Memory) 11 as an area for storing system information or the like, an RAM (Random Access Memory) 12 as a work area for executing a program or the lie, a CPU (Central Processing Unit) 13 for performing overall control of the external device 10, a network I/F (Interface) 14 as an interface device for connecting the external device 10 and the printer 20, and a storage 15 for storing various data including programs or the like.

The storage 15 is, as described above, a storage device for storing various data including programs or the like. Specifically, the storage 15 stores data including firmware and the download processing program 2 for performing download processing of the firmware. These are the descriptions of the system configuration of the external device 10 relating to the present invention.

The printer 20 has three main components, a network I/F (Interface) 30, a printer engine controller 40, and a printer engine 50.

The network I/F 30 is an interface device for communicating with other devices via a network. Specifically, the network I/F 30 receives a print request from other devices including the external device 10, and transmits to the printer engine controller 40 various programs received from the external device 10. This means that, the network I/F 30 receives the download processing program 2 and the firmware stored in the external device 10 and passes them along to the printer engine controller 40.

The printer engine controller 40, which is a printed control board, controls operations of the components of the printer engine 50 to be described later, according to the firmware so as to form an image on paper or the like.

The printer engine controller 40 includes an external I/F (Interface) 41, a CPU 42, an RAM (Random Access Memory) 43, and a flash ROM (Read Only Memory) 44.

The external I/F 41 is an interface device which connects the printer engine controller 40 with other processing functional units of the printer 20. Specifically, the external I/F 41 receives various programs received from the external device 10 via the network I/F30. The external I/F 41 is also connected to the printer engine 50 so that control signals are exchanged between the printer engine controller 40 and the printer engine 50 via the external I/F 41.

The CPU 42 is a processing unit for controlling and managing operation of the components of the printer engine controller 40. This means that the processing functional units of the printer engine controller 40 operate according to instructions from the CPU 42. The CPU 42 also exchanges various control signals and data with the printer engine 50 connected via the external I/F 41 to control operation of the printer engine 50.

The RAM 43 is an area which is temporarily used during execution of a program. The RAM 43 is a volatile memory which data can be read from and written to, and erases the written data when power is turned off. The firmware downloaded from the external device 10 is stored and executed in the RAM 43.

The flash ROM 44 is a non-volatile memory which is capable of electrically erasing (rewriting) data, and in which the data is not erased when power is turned off. The download processing program 1 is stored in the flash ROM 44, and is executed upon power-on. The download processing program 1 is a program not dependent on the printer 20 and has no device-specific information.

Figure 3:
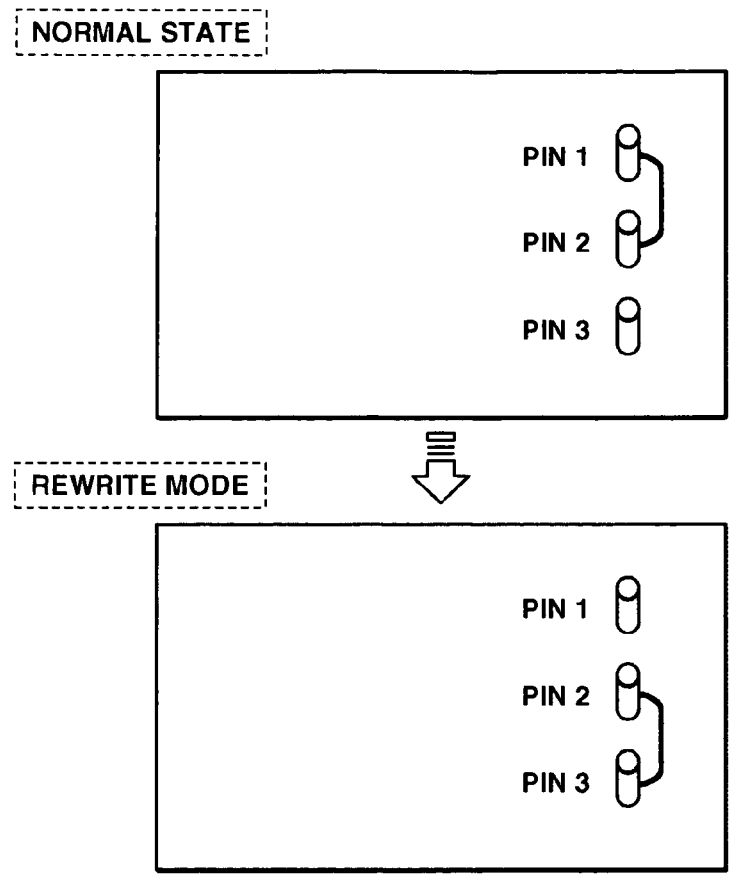
FIG. 3 shows an example of a method of rewriting the contents of a flash ROM 44.

The contents stored in the flash ROM 44 may be rewritten, for example, as shown in FIG. 3, by replacing a jumper pin arranged in the printer engine controller 40. In this case, pins 1 and 2 among three pins are short-circuited by the jumper pin in the normal state (data non-rewritable state), whereas the pins 2 and 3 are short-circuited by replacing the jumper pin when rewriting the contents of the flash ROM 44.

When power is turned on in this state, the printer engine controller 40 will transit to a flash ROM 44 rewriting mode in its activation processing which is done upon power-on. Once the printer engine controller 40 has transited to the rewriting mode, data received via the network I/F 30 and the external I/F 41 can be written in the flash ROM 44. These are the descriptions of the system configuration of the printer 20 relating to the present invention.

Figure 4:
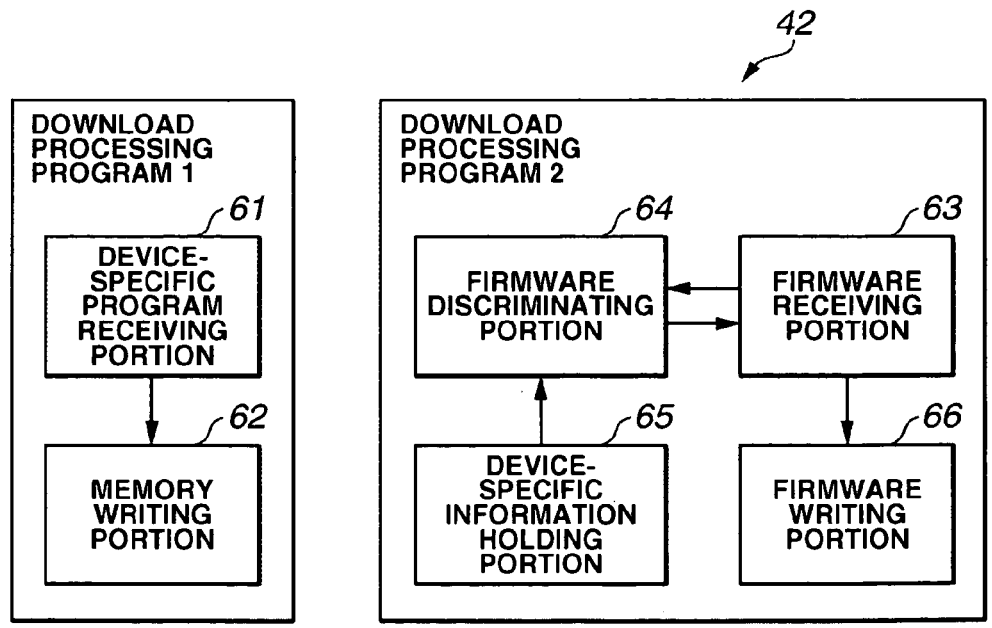
FIG. 4 is a block diagram showing a part of the functional configuration of a printer engine controller 40.

FIG. 4 is a block diagram showing a part of a functional configuration of the printer engine controller 40. The control processing according to the present invention is performed by the download processing program 1 and the download processing program 2, which are mainly executed on the CPU 42.

The download processing program 1 and the download processing program 2 include, as their processing functional portions, a device-specific program receiving portion 61, a memory writing portion 62, a firmware receiving portion 63, a firmware discrimination portion 64, a device-specific information holding portion 65, and a firmware writing portion 66.

The device-specific program receiving portion 61 and the memory writing portion 62 are provided by the download processing program 1. The firmware receiving portion 63, the firmware discrimination portion 64, the device-specific information holding portion 65, and the firmware writing portion 66 are provided by the download processing program 2.

The device-specific program receiving portion 61 is a processing portion for receiving the download processing program 2 from the external device 10. The memory writing portion 62 is a processing portion for writing the download processing program 2 received by the device-specific program receiving portion 61 into the flash ROM 44.

The firmware receiving portion 63 is a processing portion for receiving firmware from the external device 10. The firmware discrimination portion 64 is a processing portion for discriminating whether the firmware received by the firmware receiving portion 63 is compatible with the printer 20.

The device-specific information holding portion 65 is a processing portion for holding device-specific information such as a model name or identification information indicating a specific device group. The firmware discrimination portion 64 determines that the received firmware is compatible if the device-specific information held in the device-specific information holding portion 65 coincides with the device-specific information held by the firmware.

The firmware writing portion 66 is a processing portion which writes the firmware received by the firmware receiving portion 63 into the RAM 43 when the firmware discrimination portion 64 determines that the firmware is compatible with the printer 20. These are the descriptions of the block diagrams showing a part of the function configuration of the printer engine controller 40.

Operation of the printer engine controller 40 (printed control board) according to the present invention will now be described with reference to FIGS. 5 and 6. The following description will be made with the assumption that the printer engine controller 40 has transited to the flash ROM 44 rewriting mode which enables rewriting of the flash ROM 44 (see FIG. 3).

Figure 5:
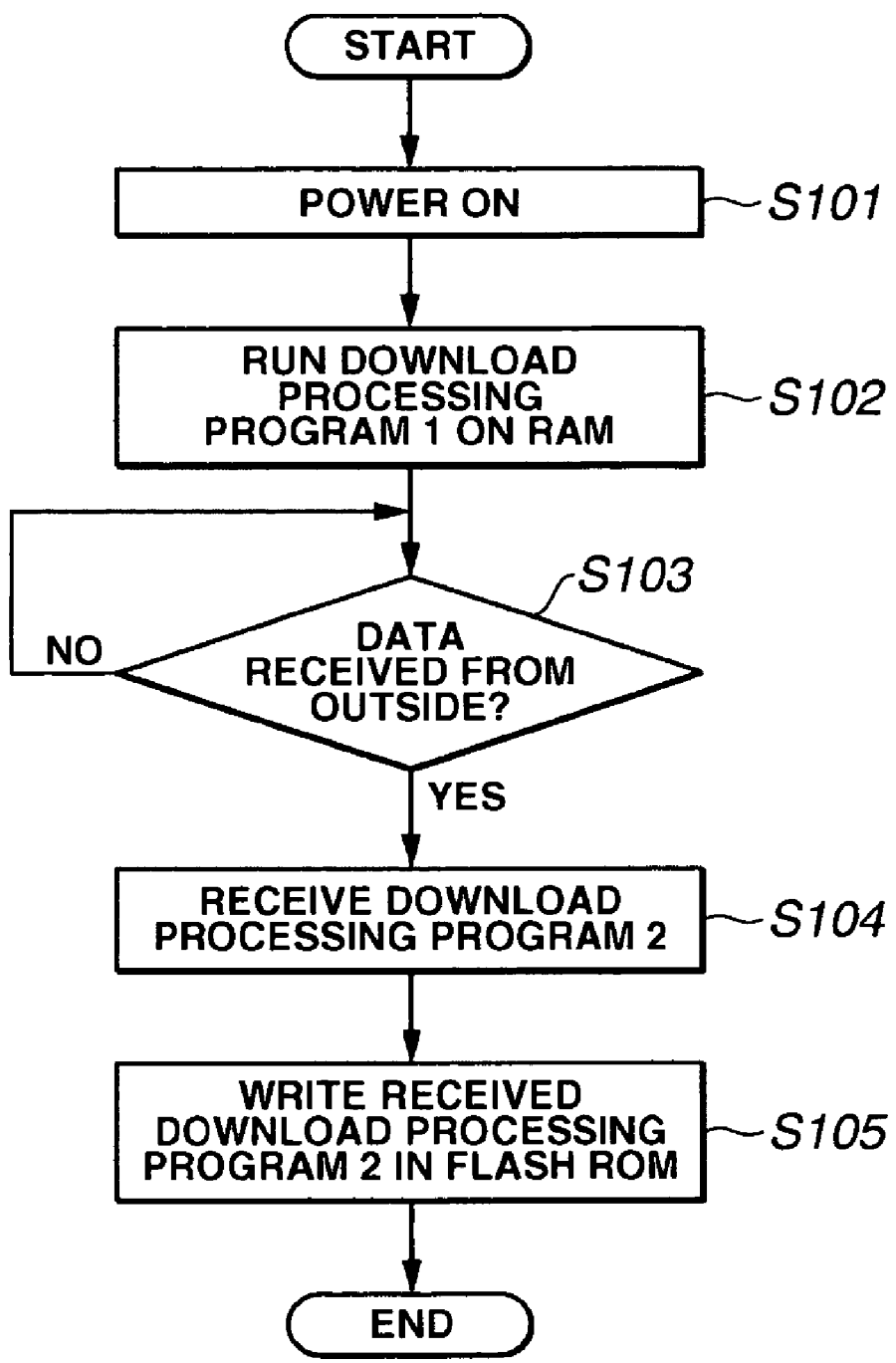
FIG. 5 is a flowchart showing contents of control of a download processing program 1.

FIG. 5 is a flowchart showing contents of control of the download processing program 1.

As shown in FIG. 5, the processing is started once the printer 20 is powered on and the printer engine controller 40 is activated (step S101). Upon start of the processing, the download processing program 1 stored in the flash ROM 44 is started by the CPU 42. Thereupon, the download processing program 1 is run on the RAM 43 (step S102). The control processing hereafter is performed according to the control of the download processing program 1.

Once the download processing program 1 is run on the RAM 43, the standby state is established until data is received via the external I/F 41 (NO in step S103). If the download processing program 2 is received via the external I/F 41 (YES in step S103), the device-specific receiving portion 61 of the download processing program 1 starts receiving the program (step S104). More specifically, the download processing program 2 is once stored in the RAM 43, while being sequentially written in the flash ROM 44. The processing terminates when the download processing program 2 has been totally received and has been written in the flash ROM 44 by the memory writing portion 62 (step S105).

Figure 6:
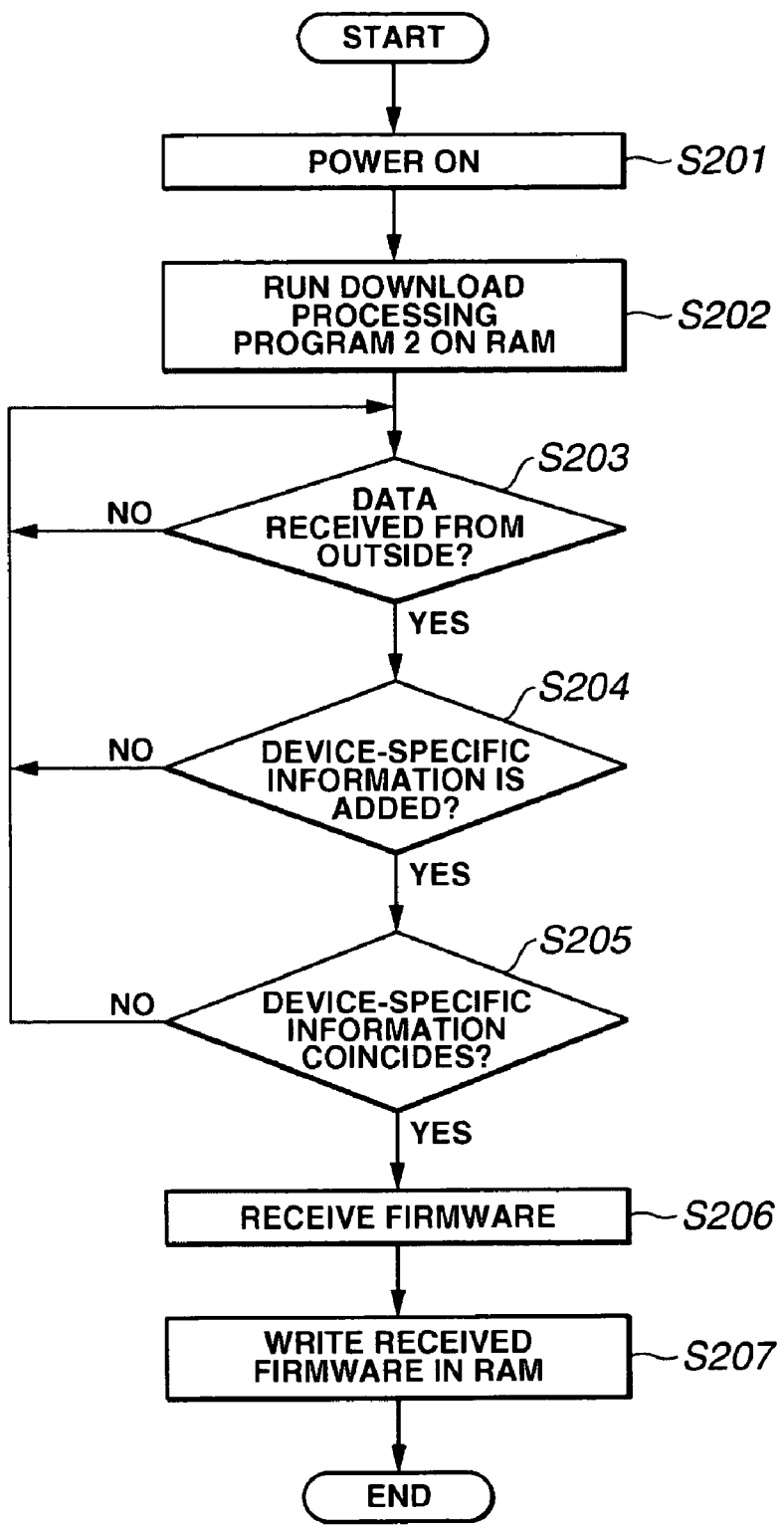
FIG. 6 is a flowchart showing the contents of control of a download processing program 2.

FIG. 6 is a flowchart showing contents of control of the download processing program 2. The following description will be made with the assumption that the download processing program 2 has been written in the flash ROM 44.

As shown in FIG. 6, the processing is started once the printer 20 is powered on and the printer engine controller 40 is activated (step S201). Upon start of the processing, the download processing program 2 stored in the flash ROM 44 is started by the CPU 42. Thereupon, the download processing program 2 is run on the RAM 43 (step S202). The control processing hereafter is performed according to the control of the download processing program 2.

Once the download processing program 2 is run on the RAM 43, the standby state is established until data is received via the external I/F 41 (NO in step S203). If firmware is received via the external I/F 41 (YES in step S203), the firmware discrimination portion 64 of the download processing program 2 determines whether the firmware received is compatible with the printer 20.

Firstly, the firmware discrimination portion 64 determines whether any device-specific information is added to the received firmware (step S203). If no device-specific information is added thereto (NO in step S203), the processing returns to step S202 to establish the standby state until data is received from the external I/F 41. Whereas, if device-specific information is added to the received firmware (YES in step S203), it is determined whether the device-specific information held by the received firmware coincides with the device-specific information such as a model name held by the device-specific information holding portion 65 of the download processing program 2 (step S204).

If it is determined that these device-specific information do not coincide with each other (NO in step S204), the processing returns to step S202 to establish the standby state until data is again received from the external I/F 41. Whereas, if it is determined that these device-specific information coincide with each other (YES in step S204), the firmware receiving portion 63 of the download processing program 2 starts receiving the program (step S206). Once the download processing program 2 has been totally received and written to the RAM 43 by the firmware writing portion 66 (step S207), the processing terminates.

These are the description of the contents of control of the download processing program 1 and the download processing program 2. As described above, the download processing program 1, which is stored in the flash ROM 44 (non-volatile memory), is not erased when power is turned off. Therefore, the download processing program 1 basically operates only upon first activation of the printer 20. On the other hand, the firmware, which is stored in the RAM 43, is erased when power is turned off. Therefore, the download processing program 2 operates upon every activation.

According to the present invention, as described above, the download processing program 1 which is not dependent on any specific device is prestored in the flash ROM 44 (non-volatile memory) of the printer engine controller 40. On the other hand, the download processing program 2 and firmware, which hold device-specific information such as a model name and are dependent on specific devices, are downloaded from an external device. As a result, the printer engine controller 40 (printed control board) with high versatility and not dependent on specific devices can be provided. Thus, the application of the processor of the present invention is not limited to specific devices. Therefore, the processor according to the present invention is effective in high-mix low-volume production and is capable of reducing the production cost.

Further, the firmware, which is stored in the RAM 43 (volatile memory), can be easily rewritten, and hence problems due to the firmware can be eliminated easily.

Further, according to the present invention, a desired control program can be downloaded via the external I/F 41 and executed. Therefore, the flexible operation of the processor is possible. For example, it is possible in a production line to download and execute a control program for performing a diagnosis test for each of the units forming a product device, and then to download and execute firmware in a process after the production to check the function of the product device.

A second embodiment of the present invention will be described in terms of a case of using the download processing program 1 which is provided with a function of diagnosing the printer engine controller 40 in addition to the functions of the first embodiment above. The feature of the download processing program 1 of being device-independent is maintained in the second embodiment as well.

Since system configuration of the second embodiment is similar to that of the first embodiment illustrated in FIG. 2, description thereof will be omitted. The following description will be made only of a functional configuration and operation of the processor according to the second embodiment.

Figure 7:
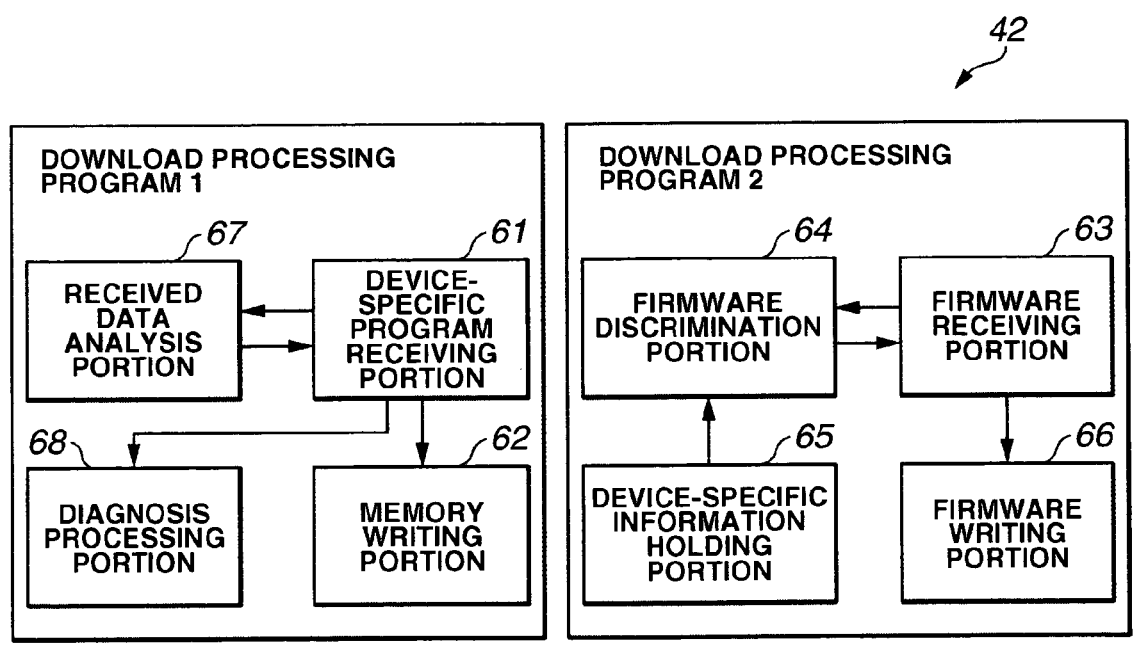
FIG. 7 is a block diagram showing a part of the functional configuration of a printer engine controller 40 according to the second embodiment of the present invention.

FIG. 7 is a block diagram showing a part of a functional configuration of the printer engine controller 40. Control processing according to the second embodiment is performed by the download processing program 1 and the download processing program 2, which are mainly executed on the CPU 42. Those portions assigned with the same reference numerals as those in FIG. 4 illustrating the first embodiment operate substantially in a same manner as those of the first embodiment. Therefore, description thereof will be omitted.

The download processing program 1 and the download processing program 2 include, as processing functional portions, a device-specific program receiving portion 61, a memory writing portion 62, a firmware receiving portion 63, a firmware discrimination portion 64, a device-specific information holding portion 65, a firmware writing portion 66, a received data analysis portion 67, and a diagnosis processing portion 68. This means that the received data analysis portion 67 and the diagnosis processing portion 68 are added to the configuration of the first embodiment described above.

The device-specific program receiving portion 61, the memory writing portion 62, the received data analysis portion 67, and the diagnosis processing portion 68 are provided by the download processing program 1, while the firmware receiving portion 63, the firmware discrimination portion 64, the device-specific information holding portion 65, and the firmware writing portion 66 are provided by the download processing program 2.

The received data analysis portion 67 is a processing portion which analyzes data received by the device-specific program receiving portion 61. More specifically, the received data analysis portion 67 analyzes whether the received data is the download processing program 2 or a diagnosis request command. If it is determined by this analysis that the received data is the download processing program 2, the received data is transferred to the memory writing portion 62. Whereas if it is determined that the received data is a diagnosis request command, the contents of analysis of the received data are transferred to the diagnosis processing portion 68.

The diagnosis processing portion 68 is a processing portion which diagnoses the components forming the printer engine controller 40 according to a command which has been determined as a diagnosis request command by the received data analysis portion 67. For example, the diagnosis processing portion 68 performs read, write and verify checks on the entire area of the RAM 43 which is a volatile memory. The diagnosis processing portion 68 also reads data at all the address of the flash ROM 44 which is a non-volatile memory to diagnose whether the checksums thereof agree. In this manner, the diagnosis processing portion 68 checks whether the printer engine controller 40 operates normally or not in particular when its is resued. These are the descriptions of the functional block diagrams showing a part of the functional configuration of the printer engine controller 40 according to the second embodiment.

Description will now be made of operation of the printer engine controller 40 (printed control board) according to the second embodiment, with reference to FIG. 8. Since the control processing in the download processing program 2 is the same as that of the first embodiment illustrated in FIG. 6, the description thereof will be omitted. The following description will be made only of control processing performed in the download processing program 1.

Figure 8:
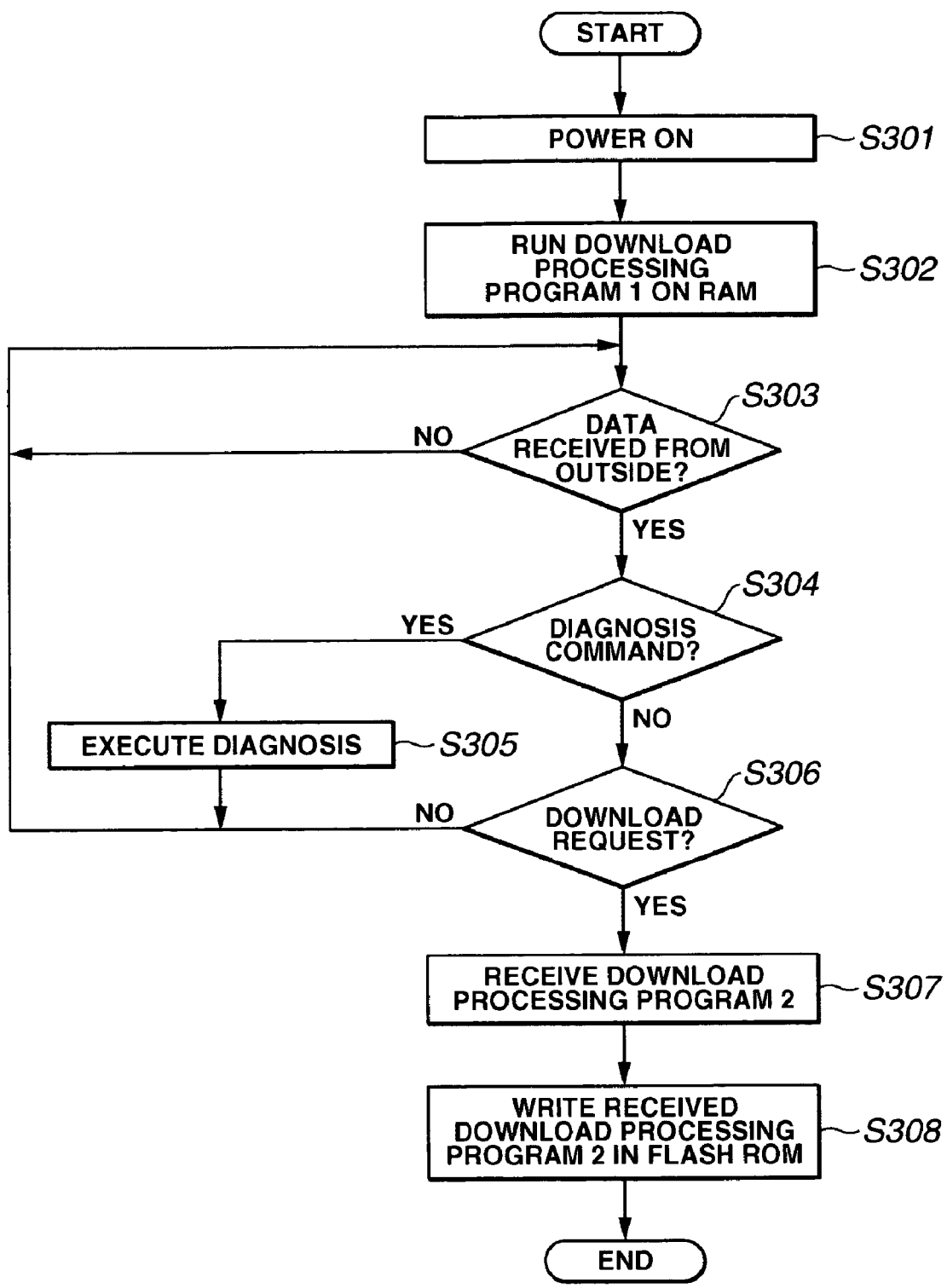
FIG. 8 is a flowchart showing the contents of control of a download processing program 1 according to the second embodiment.

FIG. 8 is a flowchart illustrating contents of control of the download processing program 1. The following description will be made on assumption that the printer engine controller 40 has transited to the flash ROM 44 rewriting mode which enables rewriting of the flash ROM 44 (see FIG. 3).

As shown in FIG. 8, the processing is started once the printer 20 is powered on and the printer engine controller 40 is activated (step S301). Upon start of the processing, the download processing program 1 stored in the flash ROM 44 is started by the CPU 42. Thereupon, the download processing program 1 is run on the RAM 43 (step S302). The control processing hereafter is performed according to the control of the download processing program 1.

Once the program is run on the RAM 43, the standby state is established until data is received via the external I/F 41 (NO in step S303). If data is received via the external I/F 41 (YES in step S303), the received data analysis portion 67 of the download processing program 1 determines whether the data received by the device-specific receiving portion 61 is the download processing program 2 or a diagnosis request command (step S304 and step S306).

If it is determined that the received data is a diagnosis request command (YES in step S304), the received diagnosis request command is analyzed by the diagnosis processing portion 68 of the download processing program 1, and the contents of the analysis are conveyed by the device-specific program receiving portion 61 to the diagnosis processing portion 68. After the diagnosis processing portion 68 performs diagnosis processing according to the command (step S305), the processing returns to step S303 and remains standby until data is received again.

In contrast, if it is determined that the received data is the download processing program 2 (No in step S304 and YES in step S306), the device-specific program receiving portion 61 of the download processing program 1 starts receiving the program (step S307). Specifically, the download processing program 2 is once stored in the RAM 43, while being sequentially written in the flash ROM 44. When the download processing program 2 has been totally received and written into the flash ROM 44 by the memory writing portion 62 (step S308), the processing terminates.

According to the second embodiment as described above, the download processing program 1 is provided with the diagnosis function in addition to the functions of the first embodiment. This makes it possible to check whether or not the printer engine controller 40 operates normally. This additional function is particularly useful when the printer engine controller 40 is to be reused, since operation thereof can be checked easily. Such high versatility and easy reuse make it possible to use resources more effectively, and thus are effective in reducing the production cost.

It should be understood that the present invention is not limited to the embodiments described above and illustrated in the accompanying drawings, and modifications and variations may be made without departing from the spirit or scope of the invention.

Figure 9A:
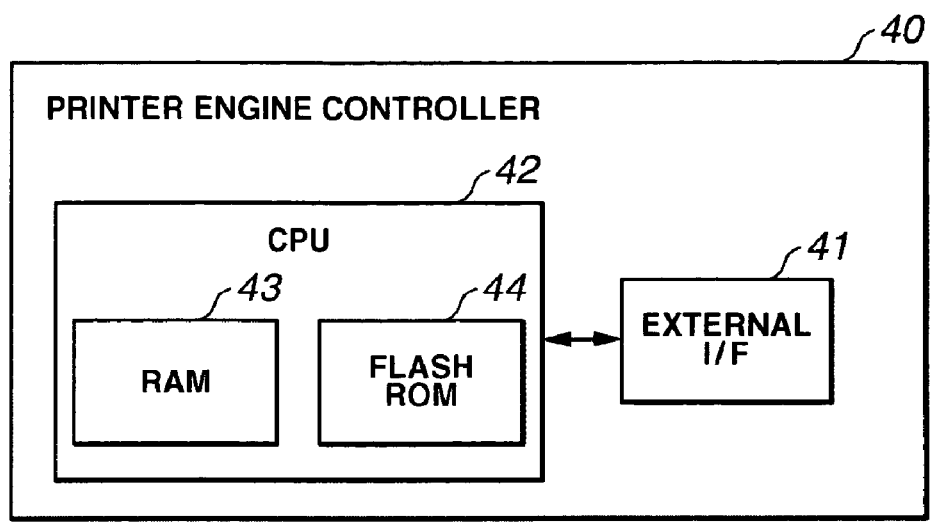
FIGS. 9A and 9B show modifications of the present invention.

For example, as shown in FIG. 9A, the present invention may be applied to a printer engine controller 40 having an RAM 43 and a flash ROM 44 arranged on the CPU 42. This makes the configuration simpler, and hence makes it possible to improve the reliability and to reduce the production cost.

Figure 9B:
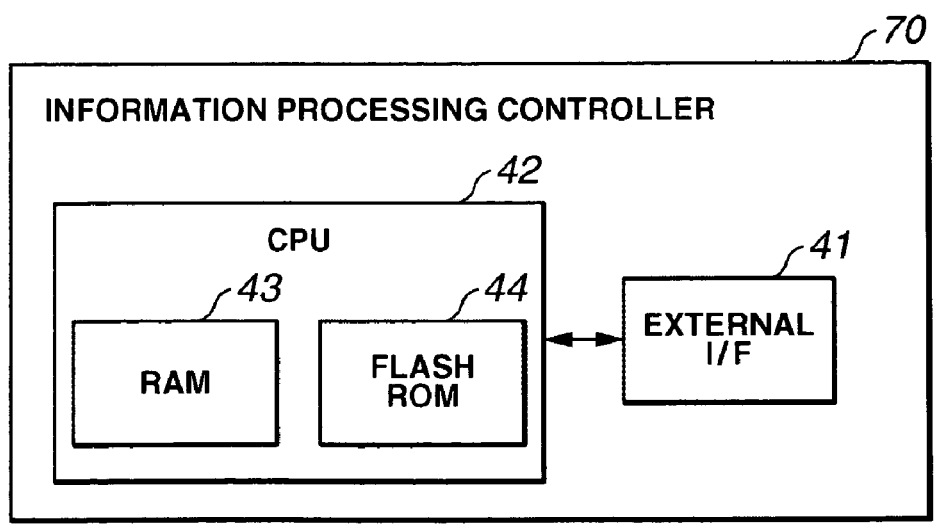

As shown in FIG. 9B, the present invention may be applied to an information processing controller 70 which is obtained by removing constituent elements required as a printer from the printer engine controller 40. In this case, the invention is applicable to a control (electronic) board which performs not only control of the image forming operation but also other controls.

The processor and the firmware download method for the same according to the present invention are applicable to processors in general having a central processing unit for performing predetermined processing based on the firmware. The processor and the firmware download method of the present invention, which are not dependent on specific devices, can be effectively used for high-mix low-volume production.

As described above, according to an aspect of the present invention, a processor comprises a central processing unit that downloads firmware from outside after starting a second program that depends on a device, stores the downloaded firmware in a volatile memory, and executes predetermined processing based on the firmware stored in the volatile memory; and a non-volatile memory that stores a device-independent first program for downloading the second program in a first program storage area thereof, wherein the central processing unit starts the first program stored in the first program storage area of the non-volatile memory to download the second program from the outside, writes the downloaded second program in a second program storage area of the non-volatile memory, and starts the second program written in the second program storage area to download the firmware from the outside.

According to another aspect of the present invention, in the processor according to the first-mentioned aspect of the present invention, the first program executes diagnosis processing for components of the device according to a diagnosis request command transmitted from the outside.

According to still another aspect of the present invention, in the processor according to the first-mentioned aspect of the present invention, the second program has device-specific information that is specific to the device, determines whether the firmware is compatible with the device based on the device-specific information before receiving the firmware from the outside, and downloads the firmware from the outside when the firmware is compatible with the device.

According to yet another aspect of the present invention, in the processor according to the first-mentioned aspect of the present invention, the central processing unit has the volatile memory and non-volatile memory arranged therein.

According to even another aspect of the present invention, in a firmware download method for a processor having a central processing unit that downloads firmware from the outside after starting a device-dependent second program, stores the downloaded firmware in a volatile memory and executes predetermined processing based on the firmware stored in the volatile memory, a device-independent first program for downloading the second program is stored in a first program storage area of a non-volatile memory; and the central processing unit starts the first program stored in the first program storage area of the non-volatile memory to download the second program from the outside and write the same in a second program storage area of the non-volatile memory, and starts the second program written in the second program storage area to download the firmware from the outside.

The forgoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-14262 filed on Jan. 21, 2005 including specification, claims, drawings and abstract is incorporated herein by reference in its entirety.

What is claimed is:

1. A processor comprising:

a central processing unit that downloads firmware from outside after starting a second program that depends on a device, stores the downloaded firmware in a volatile memory, and executes predetermined processing based on the firmware stored in the volatile memory; and a non-volatile memory that stores a device-independent first program for downloading the second program in a first program storage area thereof, wherein the central processing unit starts the first program stored in the first program storage area of the non-volatile memory to download the second program from the outside, writes the downloaded second program in a second program storage area of the non-volatile memory, and starts the second program written in the second program storage area to download the firmware from the outside.

2. The processor according to claim 1, wherein the first program executes diagnosis processing for components of the device according to a diagnosis request command transmitted from the outside.

3. The processor according to claim 1, wherein the second program has device-specific information that is specific to the device, determines whether the firmware is compatible with the device based on the device-specific information before receiving the firmware from the outside, and downloads the firmware from the outside when the firmware is compatible with the device.

4. The processor according to claim 1, wherein the central processing unit has the volatile memory and non-volatile memory arranged therein.

5. A firmware download method for a processor having a central processing unit that downloads firmware from the outside after starting a device-dependent second program, stores the downloaded firmware in a volatile memory and executes predetermined processing based on the firmware stored in the volatile memory, wherein:

a device-independent first program for downloading the second program is stored in a first program storage area of a non-volatile memory; and the central processing unit starts the first program stored in the first program storage area of the non-volatile memory to download the second program from the outside and write the same in a second program storage area of the non-volatile memory, and starts the second program written in the second program storage area to download the firmware from the outside.

* * * * *